(12) United States Patent
Chien et al.

(10) Patent No.: US 11,892,653 B2
(45) Date of Patent: Feb. 6, 2024

(54) LIGHT SOURCE MODULE

(71) Applicant: Qisda Corporation, Taoyuan (TW)

(72) Inventors: Chih-Shiung Chien, Taoyuan (TW);
Ming-Kuen Lin, Taoyuan (TW);
Yi-Ling Lo, Taoyuan (TW);
Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 99 days.

(21) Appl. No.: 17/731,209

(22) Filed: Apr. 27, 2022

(65) Prior Publication Data
US 2023/0135388 A1    May 4, 2023

(30) Foreign Application Priority Data
Oct. 29, 2021 (TW) .................. 110140447

(51) Int. Cl.
| | |
|---|---|
| *G02B 27/10* | (2006.01) |
| *G02B 27/14* | (2006.01) |
| *F21V 7/22* | (2018.01) |
| *F21Y 113/10* | (2016.01) |

(52) U.S. Cl.
CPC ............ *G02B 27/1006* (2013.01); *F21V 7/22* (2013.01); *G02B 27/141* (2013.01); *F21Y 2113/10* (2016.08)

(58) Field of Classification Search
CPC .......................... G02B 27/1006; G02B 27/145; G02B 27/141; F21V 7/22; F21V 13/12; F21Y 2113/10; F21Y 2115/10; F21K 9/60
See application file for complete search history.

(56) References Cited

U.S. PATENT DOCUMENTS

2017/0075203 A1*    3/2017   Cheng .................. H04N 9/3158

\* cited by examiner

*Primary Examiner* — Anne M Hines
*Assistant Examiner* — Jose M Diaz (57) ABSTRACT

A light source module includes a first light-splitting element, a second light-splitting element, a first light source, a second light source and a third light source. The first light source emits a first light having a first wavelength to the first light-splitting element in a first optical path direction. The second light source emits a second light having the first wavelength to the first light-splitting element in a second optical path direction perpendicular to the first optical path direction. The third light source emits a third light having a second wavelength to the first and second light-splitting elements in a third optical path direction opposite to the second optical path direction, and the second wavelength is different from the first wavelength. The first light source and the second light source include reflection layers configured to reflect light having the first wavelength.

20 Claims, 7 Drawing Sheets

LIGHT SOURCE MODULE

This application claims the benefit of Taiwan application Serial No. 110140447, filed Oct. 29, 2021, the subject matter of which is incorporated herein by reference.

TECHNICAL FIELD

The disclosure relates in general to a light source module.

BACKGROUND

The application of a light source modules is wide, and many devices such as a projector, an illuminator, a flashlight, etc. needs the light source modules. Generally speaking, the greater the luminous brightness of the light source module is, the wider the application of the light source module is and the better the lighting effect is. Therefore, submitting a new light source module capable of providing higher brightness is one of the goals of the industry in this technical field.

SUMMARY

According to an embodiment, a light source module is provided. The light source module includes a first light-splitting element, a second light-splitting element, a first light source, a second light source and a third light source. The first light source is configured to emit a first light having a first wavelength to the first light-splitting element in a first optical path direction. The second light source is configured to emit a second light having the first wavelength to the first light-splitting element in a second optical path direction substantially perpendicular to the first optical path direction. The third light source is configured to emit a third light having a second wavelength to the first light-splitting element and the second light-splitting element in a third optical path direction, wherein the third optical path direction is opposite to the second optical path direction, and the second wavelength is different from the first wavelength. The first light source includes a first reflection layer, the second light source includes a second reflection layer, and the first reflection layer and the second reflection layer are configured to reflect light having the first wavelength.

The above and other aspects of the disclosure will become better understood with regard to the following detailed description of the preferred but non-limiting embodiment (s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1A:
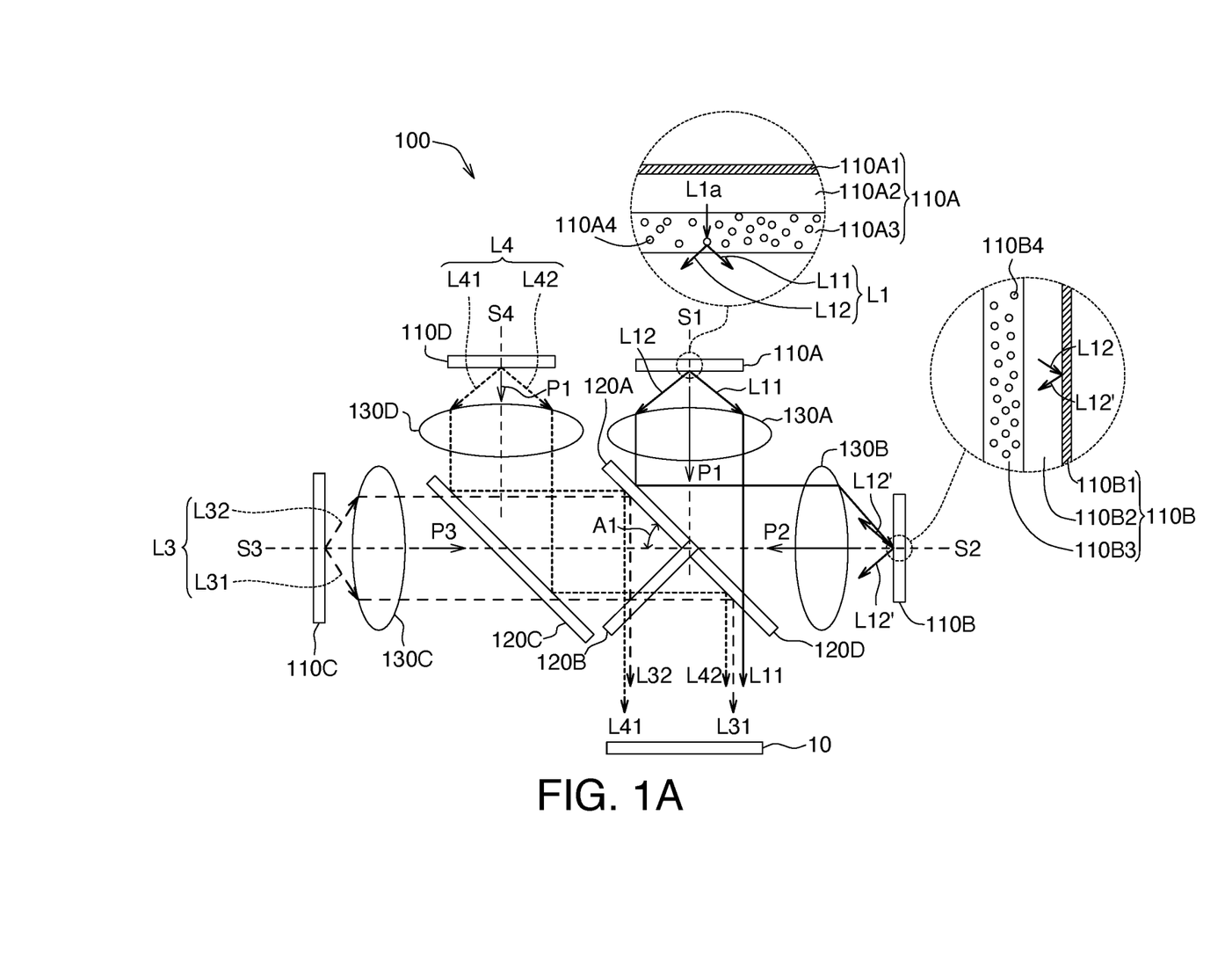
FIGS. 1A and 1B show schematic diagrams of a light source module according to an embodiment of the present invention.
Figure 1B:
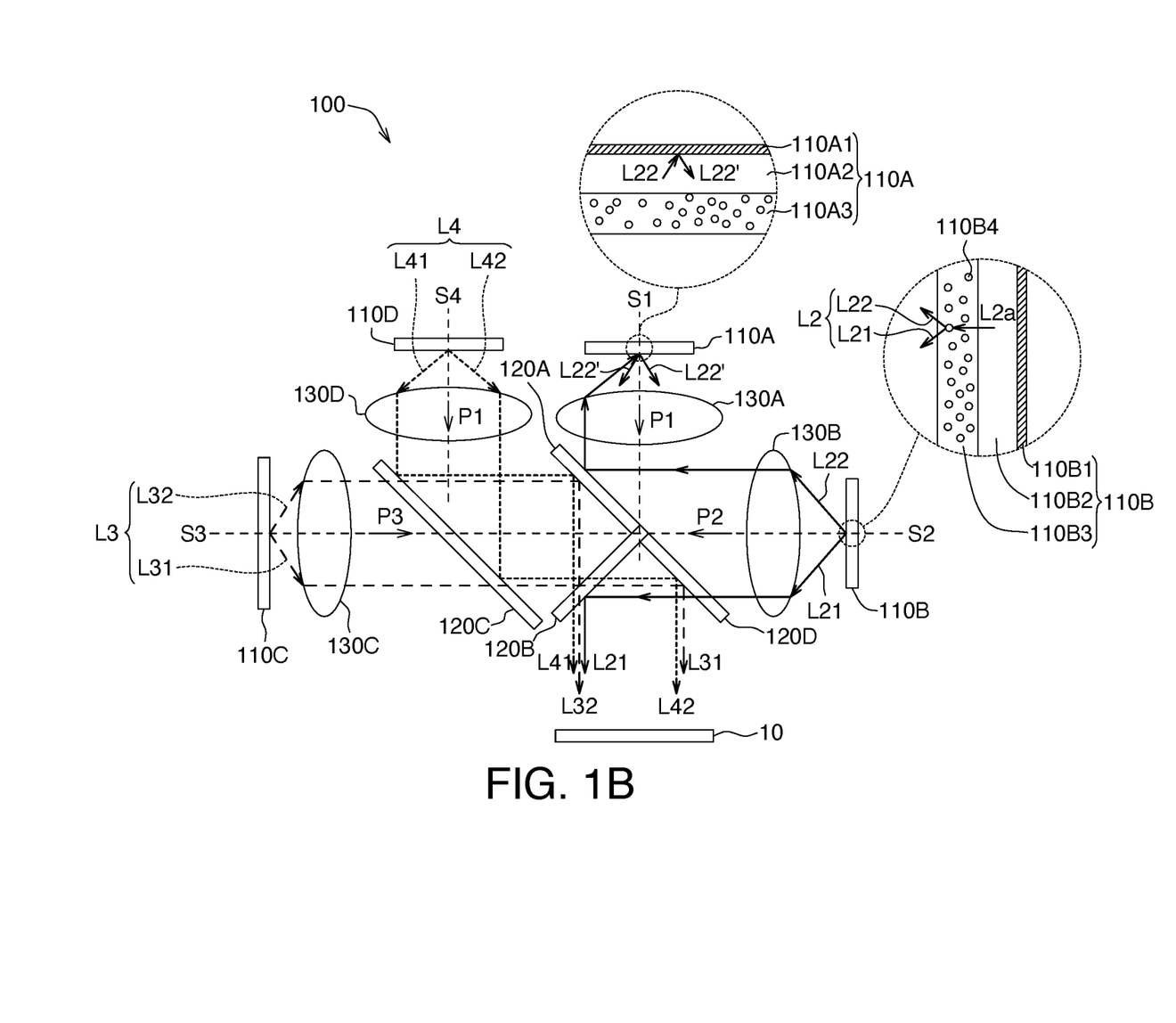

Referring to FIGS. 1A and 1B, FIGS. 1A and 1B show schematic diagrams of a light source module 100 according to an embodiment of the present invention. The light source module 100 could be applied to a device such as a projector, an illuminator, a display or other types of devices that needs a light source. For the projector, the light source module 100 is also referred to as a light combining module.

The light source module 100 includes a first light source 110A, a second light source 110B, a third light source 110C, a fourth light source 110D, a first light-splitting element 120A, a second light-splitting element 120B, a third light-splitting element 120C, a fourth light-splitting element 120D and at least one condensing lens (for example, a first condensing lens 130A, a second condensing lens 130B, a third condensing lens 130C and a fourth condensing lens 130D).

As shown in FIG. 1A, the first light source 110A is configured for emitting a first light L1 (including light L11 and light L12) having a first wavelength to the first light-splitting element 120A in the first optical path direction P1. As shown in FIG. 1B, the second light source 110B is configured to emit the second light L2 (including light L21 and light L22) having the first wavelength to the second light-splitting element 120B in the second optical path direction P2 substantially perpendicular to the first optical path direction P1. The third light source 110C is configured for emitting a third light L3 having a second wavelength to travel in a third optical path direction P3 opposite to (or reverse to) the second optical path direction P2, wherein the second wavelength is different from the first wavelength. The first light source 110A includes a first reflection layer 110A1, and the second light source 110B includes a second reflection layer 110B1. The first reflection layer 110A1 and the second reflection layer 110B1 are configured to reflect light. For example, the first reflection layer 110A1 reflects a portion of the second light L2 (for example, the fourth part L22, described later), while the second reflective layer 110B1 reflects a portion of the first light L1 (for example, the second part L12, described later). As a result, by the configuration of the first light-splitting element 120A, an optical path length of the first light L1 could be shortened, and by the configuration of the second light-splitting element 120B, an optical path length of the second light L2 could be shortened. In addition, due to the first light source 110A and the second light source 110B having the same wavelength and oppositely disposed, it could increase the brightness of the light source module 100.

In the present embodiment, the first wavelength ranges, for example, between 495 nanometers (nm) and 570 nm, and the second wavelength ranges, for example, between 450 nm and 475 nm, or between 620 nm and 750 nm. Furthermore, the first light L1 and the second light L2 are, for example, green light, and the third light L3 is, for example, blue light or red light. Green light accounts for about 70% of white light. The higher the proportion of green light is, the higher the brightness of white light is. Since the light emitted by the light source module 100 includes mixed light of two beams of the green light (the first light L1 and the second light L2), the brightness of the white light emitted by the light source module 100 could be enhanced.

As shown in FIGS. 1A and 1B, the first light source 110A and the second light source 110B are disposed adjacent to each other. The first light source 110A is disposed in a first center line (or optical axis) S1, for example, the first center line S1 passes through a center of the first light source 110A. The first light L1 emitted by the first light source 110A is divided into the first part L11 and the second part L12 relative to the first center line S1. The first part L11 is incident to a module 10, on a side of the first center line S1, in the first optical path direction P1 through the fourth light-splitting element 120D, wherein the module 10 is, for example, an illuminating module or an imaging module. The second part L12 is incident, on the other side of the first center line S1, to the first light-splitting element 120A in the first optical path direction P1, is incident to the second light source 110B through the first light-splitting element 120A, and is reflected by the second reflection layer 110B1 of the second light source 110B (the reflected light is hereinafter referred to as the second reflected part L12'). The second reflected part L12' is similar or the same as the optical path of the second light L2 of the second light source 110B (as shown in FIG. 1B). The optical path of the second light L2 will be described later.

As shown in FIG. 1B, the second light source 110B is disposed in the second center line S2, for example, the second center line S2 passes through a center of the second light source 110B. The second light L2 emitted by the second light source 110B is divided into the third part L21 and the fourth part L22 relative to the second center line S2. The third part L21 is incident, on a side of the second center line S2, to the fourth light-splitting element 120D in the second optical path direction P2 and is incident to the module 10 through the fourth light-splitting element 120D and the second light-splitting element 120B. The fourth part L22 is incident, on the other side of the second center line S2, to the first light-splitting element 120A in the second optical path direction P2, is incident to the first light source 110A through the first light-splitting element 120A, and then is reflected by the first reflection layer 110A1 of the first light source 110A (the reflected light is hereinafter referred to as the fourth reflected part L22'). The fourth reflected part L22' is similar or the same as the optical path of the first light L1 of the first light source 110A (as shown in FIG. 1A).

Similar to the optical path of the second light L2, a portion of the second reflected part L12' (FIG. 1A) is incident to the first light source 110A, and another portion travels to the module 10. Similar to the optical path of the first light L1, a portion of the fourth reflected part L22' (FIG. 1B) is incident to the second light source 110B, and another part travels to the module 10. According to such structure, the light utilization rate could be increased. After the first light L1 and the second light L2 are reflected several times, light is finally emitted from the light source module 100.

Although the optical path of the first light L1 and the optical path of the second light L2 are shown in FIGS. 1A and 1B respectively, the optical path of the first light L1 shown in FIG. 1A and the optical path of the second light L1 shown in FIG. 1B could be occur simultaneously.

As shown in FIG. 1A, the first light source 110A further includes a first light-emitting layer 110A2 and a first wavelength conversion layer 110A3. The first light-emitting layer 110A2 is formed between the first wavelength conversion layer 110A3 and the first reflective layer 110A1, and the first wavelength conversion layer 110A3 is closer to the first light-splitting element 120A than the first reflective layer 110A1. The first light-emitting layer 110A2 includes, for example, at least one semiconductor epitaxial layer which could emit light L1a. The first wavelength conversion layer 110A3 could convert the light L1a into the first light L1 having the first wavelength. In the present embodiment, the light L1a is, for example, light having the second wavelength, for example, blue light or red light. The first wavelength conversion layer 110A3 includes a plurality of fluorescent particles 110A4 which could excite light for converting the wavelength of the light. For example, the first wavelength conversion layer 110A3 converts the light L1a (for example, blue light) into the first light L1 (for example, green light) having the first wavelength. In another embodiment, the light L1a emitted by the first light-emitting layer 110A2 could be the first light L1 having the first wavelength, and, in this example, the first light source 110A could omit the first wavelength conversion layer 110A3.

As shown in FIG. 1B, the second light source 110B further includes a second light-emitting layer 110B2 and a second wavelength conversion layer 110B3. The second light emitting layer 110B2 is formed between the second wavelength conversion layer 110B3 and the second reflective layer 110B1, and the second wavelength conversion layer 110B3 is closer to the first light-splitting element 120A than the second reflective layer 110B1. The second light-emitting layer 110B2 includes, for example, at least one semiconductor epitaxial layer which could emit light L2a. The second wavelength conversion layer 110B3 could convert the light L2a into the second light L2 having the first wavelength. In the present embodiment, the light L2a is, for example, light having the second wavelength, for example, blue light or red light. The second wavelength conversion layer 110B3 includes a plurality of fluorescent particles 110B4 which could excite light for converting the light wavelength. For example, the second wavelength conversion layer 110B3 converts the light L2a (for example, blue light) into the second light L2 (for example, green light) having the first wavelength. In another embodiment, the light L2a emitted by the second light-emitting layer 110B2 could be the second light L2 having the first wavelength, and, in this example, the second light source 110B could omit the second wavelength conversion layer 110B3.

As shown in FIG. 1A, the third light source 110C is disposed in the third center line S3. For example, the third center line S3 passes through the center of the third light source 110C. The third light L3 emitted by the third light source 110C is divided into a fifth part L31 and a sixth part L32 relative to the third center line S3. The fifth part L31 is incident, on a side of the third center line S3, to the third light-splitting element 120C in the third optical path direction P3, and is incident to the module 10 through the third light-splitting element 120C, the second light-splitting element 120B and the fourth light-splitting element 120D, while the sixth part L32 is incident, on the other side of the third center line S3, to the third light-splitting element 120C in the third optical path direction P3, and is incident to the module 10 through the third light-splitting element 120C, the first light-splitting element 120A and the second light-splitting element 120B. In addition, the third center line S3 and the second center line S2 are substantially coincident with each other, but they could also be staggered.

As shown in FIG. 1A, the fourth light source 110D is configured to emit a fourth light L4 having a third wavelength, wherein the fourth light L4 is incident to the module 10 through the third light-splitting element 120C, the first light-splitting element 120A and the second light-splitting element 120B in the first optical path direction P1, wherein the third wavelength is different from the first wavelength and the second wavelength. In an embodiment, the second wavelength ranges, for example, between 620 nm and 750 nm, and the third wavelength ranges, for example, between 450 nm and 475 nm. Specifically, the third light L3 is, for example, red light, and the fourth light L4 is, for example, blue light.

As shown in FIG. 1A, the fourth light source 110D is disposed in a fourth center line S4, for example, the fourth center line S4 passes through a center of the fourth light source 110D. The fourth light L4 emitted by the fourth light source 110D is divided into a seventh part L41 and an eighth part L42 relative to the fourth center line S4, and the seventh part L41 is incident, on a side of the fourth center line S4, to third light-splitting element 120C in the first optical path direction P1 and is incident to the module 10 through the third light-splitting element 120C, the first light-splitting element 120A and the second light-splitting element 120B, while the eighth part L42 is incident, on the other side of the fourth center line S4, to the third light-splitting element 120C in the first optical path direction P1 and is incident to the module 10 through the third light-splitting element 120C, the second light-splitting element 120B and the fourth light-splitting element 120D.

As shown in FIG. 1A, the first light-splitting element 120A and the fourth light-splitting element 120D are disposed opposite to the first light source 110A. The first light-splitting element 120A and the fourth light-splitting element 120D are disposed on opposite sides of the first center line S1. As a result, the first part L11 and the second part L12 of the first light L1 emitted by the first light source 110A are incident to the light-splitting element 120D and the first light-splitting element 120A respectively.

As shown in FIG. 1A, the first light-splitting element 120A and the fourth light-splitting element 120D are disposed opposite to the third light source 110C. The first light-splitting element 120A and the fourth light-splitting element 120D are respectively disposed on opposite sides of the third center line S3, and the fifth part L31 and the sixth part L32 of the third light L3 are incident to the fourth light-splitting element 120D and the first light-splitting element 120A respectively and is reflected to the module 10 by the fourth light-splitting element 120D and the first light-splitting element 120A.

As shown in FIG. 1A, the first light-splitting element 120A and the fourth light-splitting element 120D are respectively disposed on opposite sides of the third center line S3. As a result, the seventh part L41 of the fourth light L4 could be reflected to the first light-splitting element 120A by a portion of the third light-splitting element 120C which is located on a side of the third center line S3, while the eighth part L42 could be reflected to the fourth light-splitting element 120D by a portion of the third light-splitting element 120C which is located on the other side of the third center line S3. Then, the seventh part L41 and the eighth part L42 could be reflected to the module 10 through the first light-splitting element 120A and the fourth light-splitting element 120D respectively.

As shown in FIG. 1A, the third light-splitting element 120C is disposed opposite to the third light source 110C. The third center line S3 passes through the third light-splitting element 120C, for example, the third center line S3 passes through a center of the third light-splitting element 120C. As a result, the third light L3 emitted by the third light source 110C could entirely travel through the third light-splitting element 120C. In addition, the third light-splitting element 120C is disposed opposite to the fourth light source 110D. The fourth center line S4 passes through the third light-splitting element 120C, for example, the fourth center line S4 passes through the center of the third light-splitting element 120C. As a result, the fourth light L4 emitted by the fourth light source 110D could be entirely reflected to the first light-splitting element 120A and the fourth light-splitting element 120D by the third light-splitting element 120C.

As shown in FIG. 1A, the first light-splitting element 120A, the second light-splitting element 120B and the third light-splitting element 120C could be connected to each other. However, in another embodiment, any two of the first light-splitting element 120A, the second light-splitting element 120B and the third light-splitting element 120C could be connected to each other. Alternatively, the first light-splitting element 120A, the second light-splitting element 120B and the third light-splitting element 120C could be disposed separately.

In terms of the arrangement position of the light-splitting element, as shown in FIG. 1A, an angle A1 of the first light-splitting element 120A relative to a horizontal reference line is, for example, 45 degrees. Similarly, the angle of the others of the light-splitting elements relative to the horizontal reference line is also, for example, 45 degrees.

The light-splitting element herein is, for example, a dichroic light-splitting element. In terms of light splitting characteristics, as shown in FIGS. 1A and 1B, the first light-splitting element 120A could reflect the first light L1 and the second light L2 having the first wavelength (for example, green light spectrum), the third light L3 having the second wavelength (for example, red light spectrum) and the fourth light L4 having the third wavelength (for example, blue light spectrum). The second light-splitting element 120B could reflect the second light L2 having the first wavelength (for example, green light spectrum) but allow the third light L3 having the second wavelength (for example, the red light spectrum) and the third light L3 having the third wavelength (for example, the blue light spectrum) of the fourth light L4 to travel through. The third light-splitting element 120C could reflect the fourth light L4 having the third wavelength (for example, blue light spectrum) but allow the third light L3 having the second wavelength (for example, red light spectrum) to travel through. The fourth light-splitting element 120D could reflect the third light L3 having the second wavelength (for example, red light spectrum) and the fourth light L4 having the third wavelength (for example, blue light spectrum) but allows the second light L2 having he first wavelength (for example, green light spectrum) to travel through.

The condensing lens could condense the light emitted by the light source, so that the light traveling through the condensing lens becomes collimated light. The condensing lens includes at least one lens, for example, a spherical lens, an aspheric lens or a combination thereof.

As shown in FIG. 1A, the first condensing lens 130A is disposed opposite to the first light source 110A. The first condensing lens 130A is disposed in the first center line S1. For example, the first center line S1 passes through a center of the first condensing lens 130A, so that the first part L11 and the second part L12 incident to the first condensing lens 130A have substantially the same amount of light relative to the first center line S1.

As shown in FIG. 1A, the second condensing lens 130B is disposed opposite to the second phase light source 110B. The second condensing lens 130B is disposed in the first center line S1. For example, the first center line S1 passes through the center of the second condensing lens 130B so that the third part L21 and the fourth part L22 incident to the second condensing lens 130B have substantially the same amount of light relative to the first center line S1.

As shown in FIG. 1A, the third condensing lens 130C is disposed opposite to the third light source 110C. The third condensing lens 130C is disposed in the third center line S3. For example, the third center line S3 passes through the center of the third condensing lens 130C, so that the fifth part L31 and the sixth part L32 incident to the third condensing lens 130C have substantially the same amount of light relative to the third center line S3.

As shown in FIG. 1A, the fourth condensing lens 130D is disposed opposite to the fourth light source 110D. The fourth condensing lens 130D is disposed in the fourth center line S4. For example, the fourth center line S4 passes through the center of the fourth condensing lens 130D, so that the fifth part L41 and the sixth part L42 incident to the fourth condensing lens 130D have substantially the same amount of light relative to the fourth center line S4.

Figure 2:
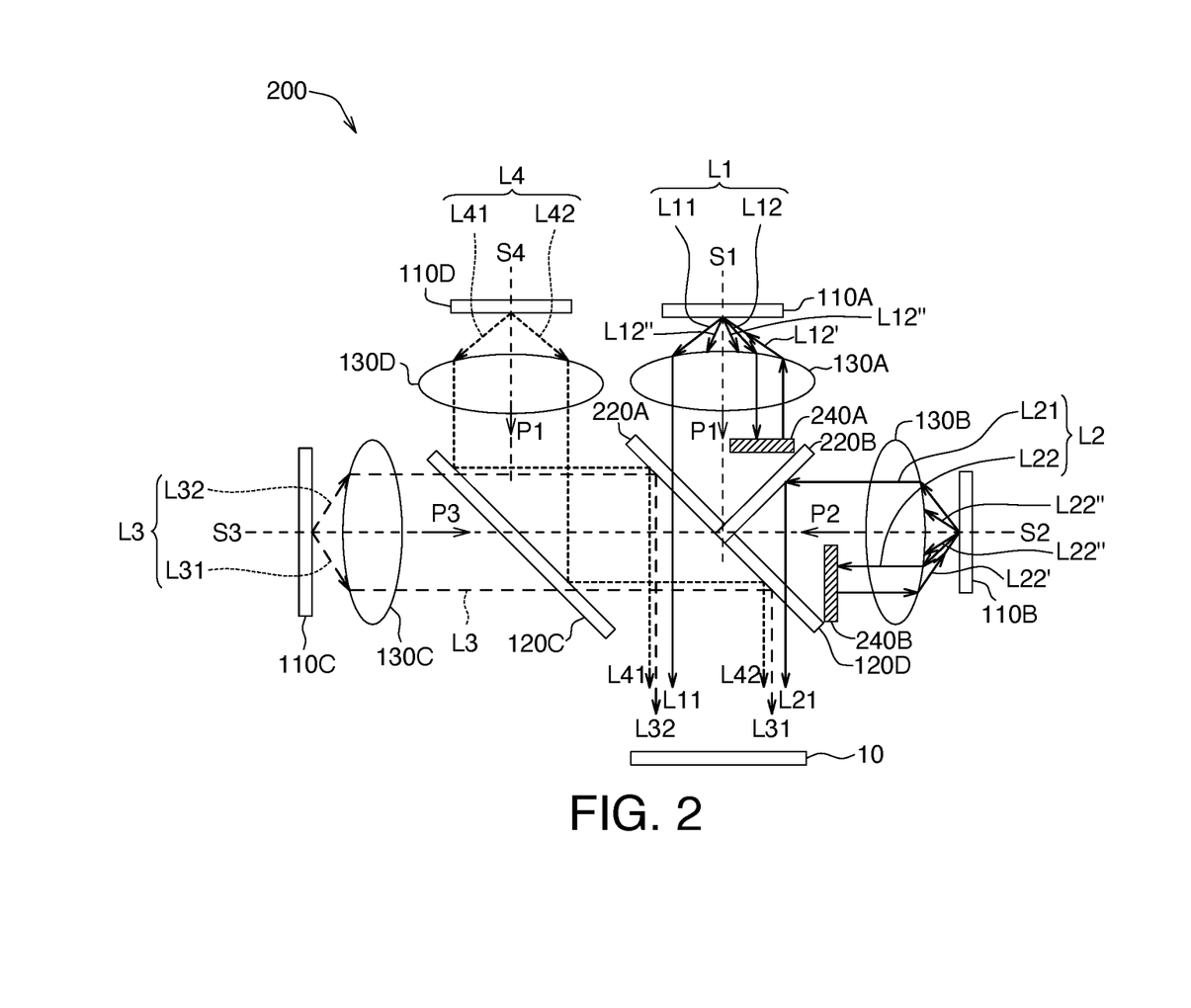
FIG. 2 shows a schematic diagram of an optical path of a light source module according to another embodiment of the present invention.

Referring to FIG. 2, FIG. 2 shows a schematic diagram of an optical path of a light source module 200 according to another embodiment of the present invention. The light source module 200 includes the first light source 110A, the second light source 110B, the third light source 110C, the fourth light source 110D, a first light-splitting element 220A, a second light-splitting element 220B, a third light-splitting element 220C, a fourth light-splitting element 220D and at least one condensing lens (for example, the first condensing lens 130A, the second condensing lens 130B, the third condensing lens 130C and the fourth condensing lens 130D), a first reflective element 240A and a second reflective element 240B. The light source module 200 of the embodiment of the present invention has the features similar to or the same as that of the light source module 100 expect that the light source module 200 further includes at least one reflective element, for example reflective mirror.

As shown in FIG. 2, the first reflector 240A is disposed opposite to the first light source 110A. The first part L11 of the first light L1 is incident to the first light-splitting element 220A in the first optical path direction P1 and then is incident to the module 10 through the first light-splitting element 220A. The second part L12 of the first light L1 is incident to the first reflective element 240A in the first optical path direction P1 and is reflected back to the first light source 110A from the first reflective element 240A (the reflected light is hereinafter referred to as the second reflected part L12'). The second reflected part L12' reflected from the first light source 110A becomes a second reflected part L12". The optical path of such second reflected part L12" is similar to or the same as the optical path of the first light L1, and the similarities will not be repeated here.

In addition, due to the arrangement of the first reflective element 240A, the light (spot) reflected back the first light source 110A from the first reflective element 240A will not be misaligned with the first light source 110A, and accordingly it could obtain a better matching effect of object-side image. In addition, since the light (spot) reflected back the first light source 110A from the first reflective element 240A will not be misaligned with the first light source 110A, the light (spot) reflected back the first light source 110A from the first reflective element 240A could be completely reflected by the first reflective layer 110A1 of the first light source 110A, and thus the problem of light leakage would not occur.

As shown in FIG. 2, the second reflective element 240B is disposed opposite to the second light source 110B. The third part L21 of the second light L2 is incident to the second light-splitting element 120B in the second optical path direction P2 and reflected to the module 10 through the second light-splitting element 220B and the third light-splitting element 220C. The fourth part L22 of the second light L2 is incident to the second reflective element 240B in the second optical path direction P2 and reflected back the second light source 110B from the second reflective element 240B (the reflected light is hereinafter referred to as the fourth reflected part L22'). The fourth reflected part L22' reflected by the second light source 110B becomes a fourth reflected part L22". The optical path of the fourth reflected part L22" is similar to or the same as the optical path of the second light L2, and the similarities will not be repeated here.

In addition, due to the arrangement of the second reflective element 240B, the light (spot) reflected back the second light source 110B from the second reflective element 240B will not be misaligned with the second light source 110B, and accordingly it could obtain a better matching effect of object-side image. In addition, since the light (spot) reflected back the second light source 110B from the second reflective element 240B will not be misaligned with the second light source 110B, the light (spot) reflected back the second light source 110B from the second reflective element 240B could be completely reflected by the second reflective layer 110B, and thus the problem of light leakage would not occur.

As shown in FIG. 2, the first light source 110A is disposed in the first center line S1. The first light-splitting element 120A and the first reflective element 240A are disposed on opposite two sides of the first center line S1 respectively. As a result, the first part L11 and the second part L12 of the first light L1 are incident to the first light-splitting element 120A and the first reflective element 240A respectively. Similarly, the second light source 110B is disposed in the second center line S2. The second light-splitting element 220B and the second reflective element 240B are respectively disposed on opposite two sides of the second center line S2. As a result, the third part L21 and the fourth part L22 of the second light L2 are incident to the second light-splitting element 220B and the second reflective element 240B respectively.

As shown in FIG. 2, the first reflective element 240A is located outside the optical path of the first part L11 of the first light L1 (that is, the first reflective element 240A is not located at the optical path of the first part L11), and thus it could prevent from being blocking the traveling of the first part L11 or reduce the amount of the blocked first part L11. The second reflective element 240B is located outside the optical path of the third part L21 of the second light L2 (that is, the second reflective element 240B is not located at the optical path of the third part L21), and thus it could prevent from being blocking the traveling of the third part L21 of the second light L2 or reduce the amount of the blocked first part L11.

In terms of light-splitting characteristics, as shown in FIG. 2, the first light-splitting element 220A could reflect the third light L3 having the second wavelength (for example, red light spectrum) and the fourth light L4 having the third wavelength (for example, blue light spectrum), but allows the first light L1 having the first wavelength (for example, green light spectrum) to travel through. The second light-splitting element 220B could reflect the second light L2 having the first wavelength (for example, green light spectrum). The third light-splitting element 120C could reflect the fourth light L4 having the third wavelength (for example, blue light spectrum) but allow the third light L3 having the second wavelength (for example, red light spectrum) to travel through. The fourth light-splitting element 120D could reflect the third light L3 having the second wavelength (for example, red light spectrum) and the fourth light L4 having the third wavelength (for example, blue light spectrum) but allows the second light L2 having the first wavelength (for example, green light spectrum) to travel through.

Figure 3A:
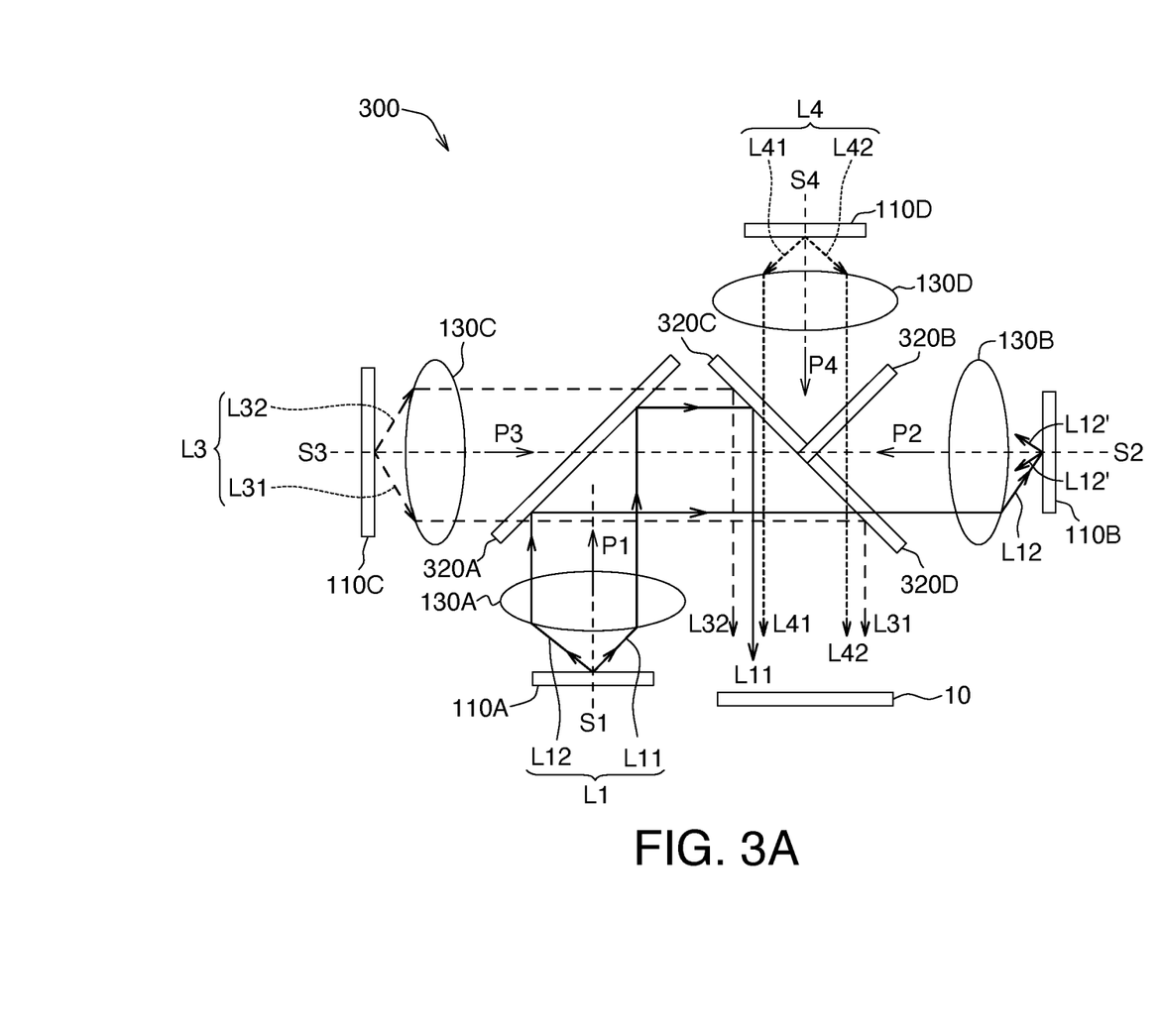
FIGS. 3A and 3B show schematic diagrams of optical paths of a light source module according to another embodiment of the present invention.
Figure 3B:
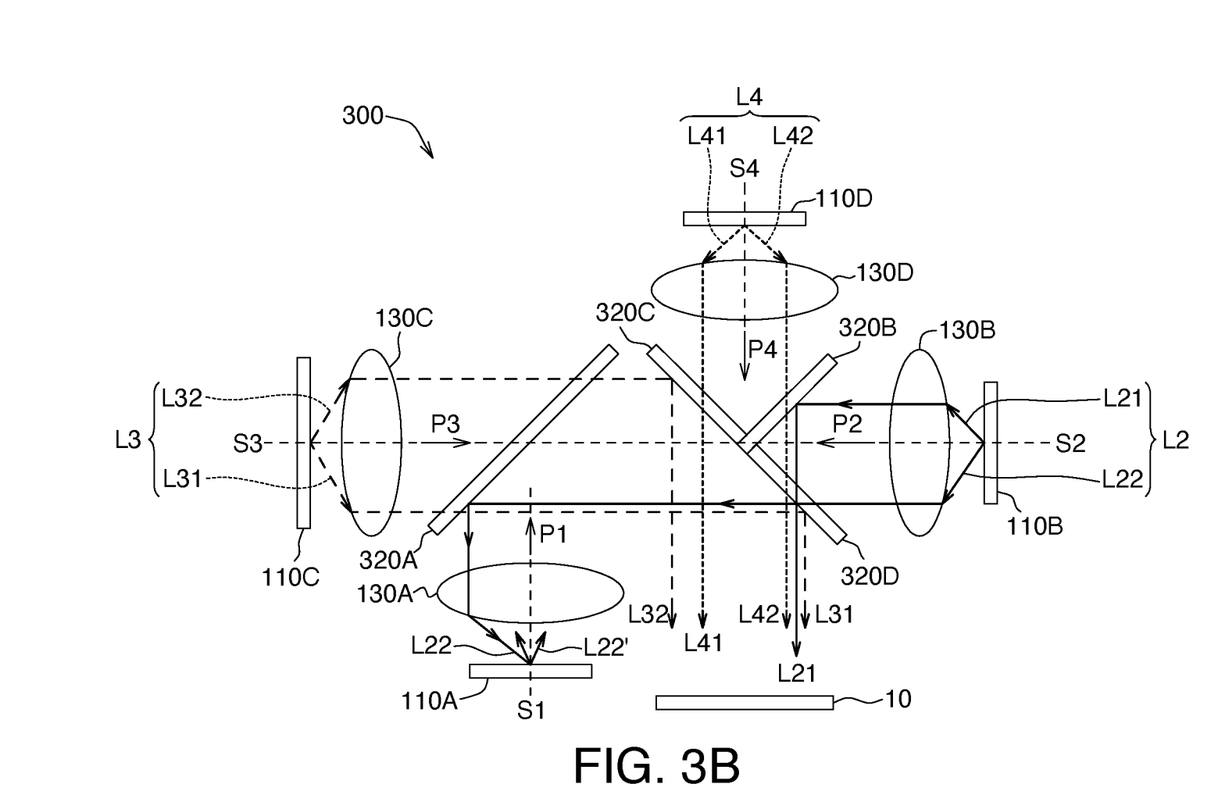

Referring to FIGS. 3A and 3B, FIGS. 3A and 3B show schematic diagrams of optical paths of a light source module 300 according to another embodiment of the present invention. The light source module 300 includes the first light source 110A, the second light source 110B, the third light source 110C, the fourth light source 110D, a first light-splitting element 320A, a second light-splitting element 320B, a third light-splitting element 320C, a fourth light-splitting element 320D and at least one condensing lens (for example, the first condensing lens 130A, the second condensing lens 130B, the third condensing lens 130C and the fourth condensing lens 130D).

As shown in FIG. 3A, the first light source 110A is disposed in the first center line S1, and the first center line S1 passes through a center of the first light-splitting element 320A. The first light L1 emitted by the first light source 110A is divided into the first part L11 and a second part L12 relative to the first center line S1, wherein the first part L11 is incident, on a side of the first center line S1, to the first light-splitting element 320A in the first optical path direction P1 and is incident to the module 10 through the first light-splitting element 320A and the third light-splitting element 320C, while the second part L12 is incident, on the other side of the first center line S1, to the first light-splitting element 320A in the first optical path direction P1, incident to the second light source 110B through the first light-splitting element 320A and the fourth light-splitting element 320D and then reflected by the second reflection layer 110B1 of the second light source 110B (the reflected light is hereinafter referred to as the second reflected part L12'). The second reflected part L12' is similar or the same as the optical path of the second light L2 of the second light source 110B (as shown in FIG. 3B).

As shown in FIG. 3B, the second light source 110B is disposed in the second center line S2, and the second center line S2 passes through the center of the second light source 110B. The second light L2 emitted by the second light source 110B is divided into the third part L21 and the fourth part L22 relative to the second center line S2, wherein the third part L21 is incident, on a side of the second center line S2, to the second light-splitting element 320B in the second optical path direction P2 and incident to the first module 10 through the second light-splitting element 320B and the fourth light-splitting element 320D, while the fourth part L22 is incident, on the other side of the second center line S2, to the first light-splitting element 320A in the second optical path direction P2, incident to the first light source 110A through the first light-splitting element 320A and then reflected by the first reflective layer 110A1 of the first light source 110A (the reflected light is hereinafter referred to as the fourth reflected part L22'). The fourth reflected part L22' is similar or the same as the optical path of the first light L1 of the first light source 110A (as shown in FIG. 3A).

As shown in FIG. 3A, the fourth light source 110D emits the fourth light L4 to the third light-splitting element 320C and the second light-splitting element 320B in the fourth optical path direction P4 opposite to the first optical path direction P1.

As shown in FIG. 3A, the first light-splitting element 320A is disposed relative to the first light source 110A. The first center line S1 passes through the first light-splitting element 320A, for example, the first center line S1 passes through the center of the first light-splitting element 320A. As a result, the first light L1 could be entirely incident to the first light-splitting element 320A. Similarly, the first light-splitting element 320A is disposed opposite to the third light source 110C. The third center line S3 passes through the first light-splitting element 320A, for example, the third center line S3 passes through the center of the first light-splitting element 320A. As a result, the third light L3 could be entirely incident to the first light-splitting element 320A.

As shown in FIG. 3B, the second light-splitting element 320B and the fourth light-splitting element 320D are respectively disposed on two opposite sides of the second center line S2. As a result, the third part L21 and the fourth part L22 of the second light L2 could be incident to the second light-splitting element 320B and the fourth light-splitting element 320D respectively. In addition, the second light-splitting element 320B and the third light-splitting element 320C are respectively disposed on two opposite sides of the fourth center line S4. As a result, the seventh part L41 and the eighth part L42 of the fourth light L4 could be incident to the third light-splitting element 320C and the second light-splitting element 320B respectively. In addition, the third light-splitting element 320C and the fourth light-splitting element 320D are respectively disposed on two opposite sides of the third center line S3. As a result, the fifth part L31 and the sixth part L32 of the third light L3 could be incident to the module 10 through the fourth light-splitting element 320D and the third light-splitting element 320C respectively.

In terms of light-splitting characteristics, as shown in FIG. 3A, the first light-splitting element 320A could reflect the first light L1 having the first wavelength (for example, green light spectrum) and the second light L2 having the first wavelength but allow the third light L3 having the second wavelength (for example, red light spectrum) to travel through. The second light-splitting element 320B could reflect the second light L2 having the first wavelength (for example, green light spectrum) but allow the fourth light L4 having the third wavelength (for example, blue light spectrum) to travel through. The third light-splitting element 320C could reflect the third light L3 having the second wavelength (for example, the red light spectrum) and the first light L1 having the first wavelength (the green light spectrum) but allow the fourth light L4 having the third wavelength (for example, the blue light spectrum) to travel through. The fourth light-splitting element 320D could reflect the third light L3 having the second wavelength (for example, the red light spectrum) but allow the second light L2 having the first wavelength (for example, the green light spectrum) and the fourth light L4 having the third wavelength (for example, the blue light spectrum) to travel through.

Figure 4:
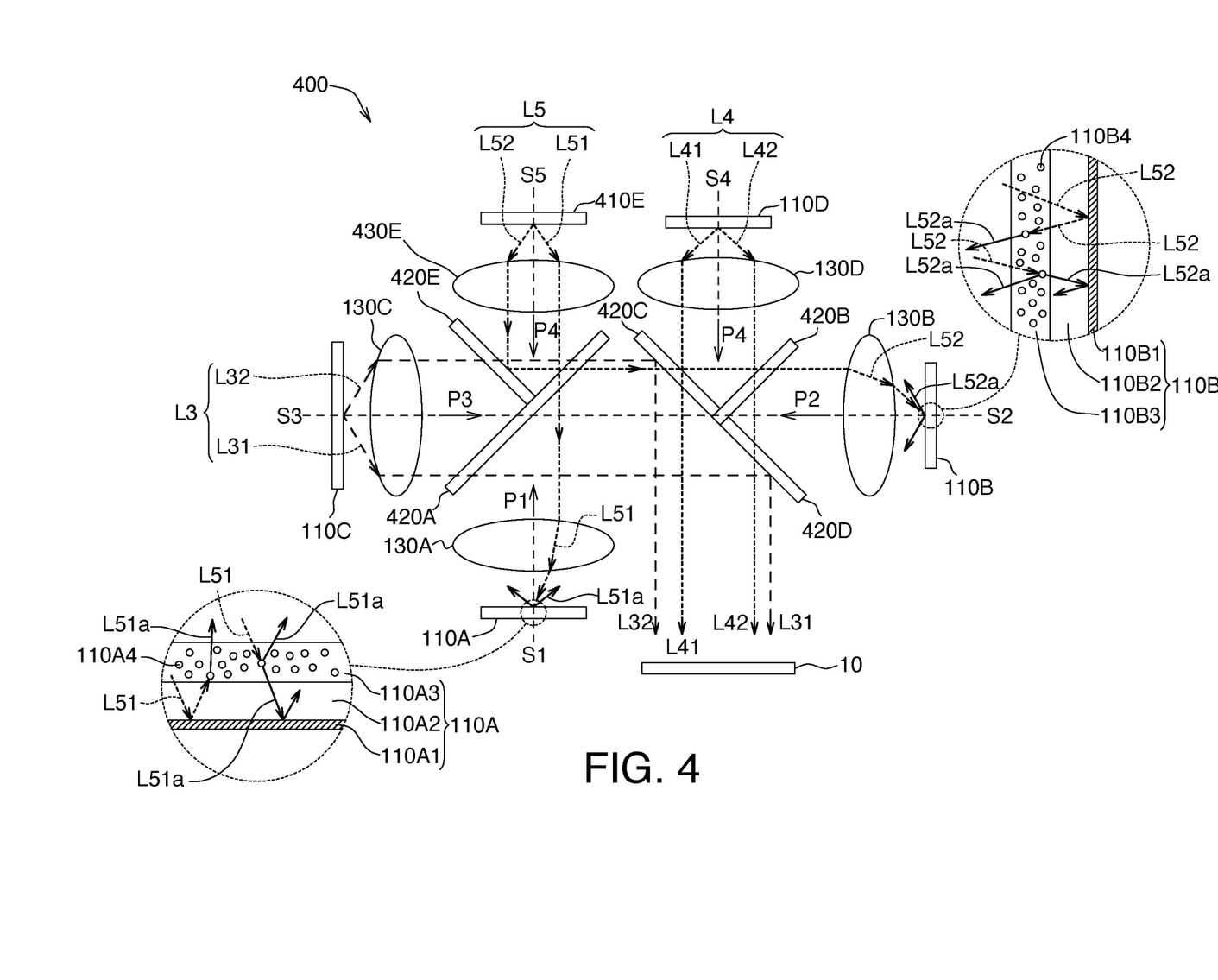
FIG. 4 shows a schematic diagram of an optical path of a light source module according to another embodiment of the present invention.

Referring to FIG. 4, FIG. 4 shows a schematic diagram of an optical path of a light source module 400 according to another embodiment of the present invention. The light source module 400 includes the first light source 110A, the second light source 110B, the third light source 110C, the fourth light source 110D, a fifth light source 410E, a first light-splitting element 420A, a second light-splitting element 420B, a third light-splitting element 420C, a fourth light-splitting element 420D, a fifth light-splitting element 420E and at least one condensing lens (for example, the first condensing lens 130A, the second condensing lens 130B, the third condensing lens 130C, the fourth condensing lens 130D and a fifth condensing lens 430E). Although not shown, the light source module 400 further includes an optical path, during operation, including the optical path of the first light L1 emitted by the first light source 110A and/or the optical path of the second light L2 emitted by the second light source 110B.

The light source module 400 has the features similar or the same as that of the light source module 300 expect that the light source module 400 further includes the fifth light source 410E, the fifth light-splitting element 420E and the fifth condensing lens 430E.

The fifth light source 410E could emit a fifth light L5 having the third wavelength to the first light source 110A through the first light-splitting element 420A and to the second light source 110B through the fifth light-splitting element 420E. In the present embodiment, the fifth light L5 and the fourth light L4 are, for example, blue light, and the third light L3 is, for example, red light.

The fifth light source 410E is disposed in the fifth center line S5, for example, the fifth center line S5 passes through a center of the fifth light source 410E. The fifth light L5 is divided into a ninth part L51 and a tenth part L52 relative to the fifth center line S5. The ninth part L51 is incident to the first light source 110A through the fifth condensing mirror 430E, the first light-splitting element 420A and the first condensing mirror 130A in sequence. After the ninth part L51 is converted into a converted light L51a having the first wavelength by the first wavelength conversion layer 110A3 of the first light source 110A, a portion of the converted light L51a is reflected to the first condensing lens mirror 130A by the first reflective layer 110A1, and another portion of the converted light is L51a is emitted to the first condensing lens 130A from the fluorescent particles 110A4. In addition, the ninth part L51 that has not been converted by the fluorescent particles 110A4 could be reflected back the first wavelength conversion layer 110A3 by the first reflective layer 110A1 to increase the probability of the wavelength of light being converted by the fluorescent particles 110A4. The optical path of the converted light L51a provided by the first light source 110A is similar or the same as the optical path of the first light L1 emitted by the first light source 110A (the first light L1 is shown in FIG. 3A), and the similarities will not be repeated here. Similarly, after the tenth part L52 is converted into a converted light L52a having the first wavelength by the second wavelength conversion layer 110B3 of the second light source 110B, a portion of the converted light L52a is reflected to the second condensing lens mirror 130B by the second reflection layer 110B1, and another portion of the converted light L52a could be directly emitted to the second condensing lens 130B from the fluorescent particles 110B4. In addition, the tenth part L52 that has not been converted by the fluorescent particles 110B4 could be reflected by the second reflective layer 110B1 back the second wavelength conversion layer 110B3 to increase the probability of the wavelength of light being converted by the fluorescent particles 110B4. The optical path of the converted light L52a provided by the second light source 110B is similar or the same as the optical path of the second light L2 emitted by the second light source 110B (The second light L2 is shown in FIG. 1B), and the similarities will not be repeated here.

To sum up, although the wavelength of the fifth light L5 emitted by the fifth light source 410E is different from the first wavelength, the fifth light L5 could be converted into the converted light L51a and L52a having the first wavelength through the first wavelength conversion layer 110A3 and the second wavelength conversion layer 110B3 to increase the amount of light which has the first wavelength and is traveled to the module 10 from the light source module 400.

In another embodiment, the first light source 110A of FIG. 4 could not emit the first light L1 and/or the second light source 110B could not emit the second light L2. Furthermore, the first light source 110A could provide the converted light L51a having the first wavelength (as if the first light source 110A emits the converted light L51a) through the first wavelength conversion layer 110A3 and the first reflective layer 110A1, and/or the second light source 110B could provide the converted light L52a having the first wavelength (as if the second light source 110B emits the converted light L52a) through the second wavelength conversion layer 110B3 and the second reflective layer 110B1. In such example, the first light source 110A could omit the first light-emitting layer 110A2 and/or the second light source 11B could omit the second light-emitting layer 110B2, that is, the first light source 110A includes the first wavelength conversion 110A3 disposed on the first reflective layer 110A1, and the second light source 110B includes the second wavelength conversion layer 110B3 disposed on the second reflective layer 110B1.

In terms of light-splitting characteristics, as shown in FIG. 4, the first light-splitting element 420A is configured to reflect the first light L1 and the second light L2 (not shown in the FIG. 4) having the first wavelength (for example, green light spectrum) but allow the third light L3 having the second wavelength (for example, red light spectrum) and the fifth light L5 having the third wavelength (for example, blue light spectrum) to travel through. The second light-splitting element 420B is configured to reflect the second light L2 (not shown in FIG. 4) having the first wavelength (for example, green light spectrum) but allow the fourth light L4 having the third wavelength (for example, blue light spectrum) to travel through. The third light-splitting element 420C is configured to reflect the third light L3 having the second wavelength (for example, red light spectrum) but allow the fourth light L4 having the third wavelength (for example, blue light spectrum) to travel through. The fourth light-splitting element 420D is configured to reflect the third light L3 having the second wavelength (for example, red light spectrum) but allow the fourth light L4 having the third wavelength (for example, blue light spectrum) to travel through and allow the fourth light L4 having the third wavelength (for example, blue light spectrum) and the second light L2 (not shown in FIG. 4) having the first wavelength (for example, green light spectrum) to travel through. The fifth light-splitting element 420E is configured to reflect the fifth light L5 having the third wavelength (for example, blue light spectrum) and the first light L1 and the second light L2 (not shown in FIG. 4) having the first wavelength (for example, green light spectrum) but allow the third light L3 having the second wavelength (for example, red light spectrum) and the fifth light L5 having the third wavelength (for example, blue light spectrum) to travel through.

In addition, the fifth condensing lens 430E is disposed opposite to the fifth light source 410E. The fifth condensing mirror 430E is disposed in the fifth center line S5, for example, the fifth central line S5 passes through a center of the fifth condensing mirror 430E, so that the ninth part L51 and the tenth part L52 incident to of the fifth condensing lens 430E have substantially the same amount of light relative to the fifth center line S5.

Figure 5:
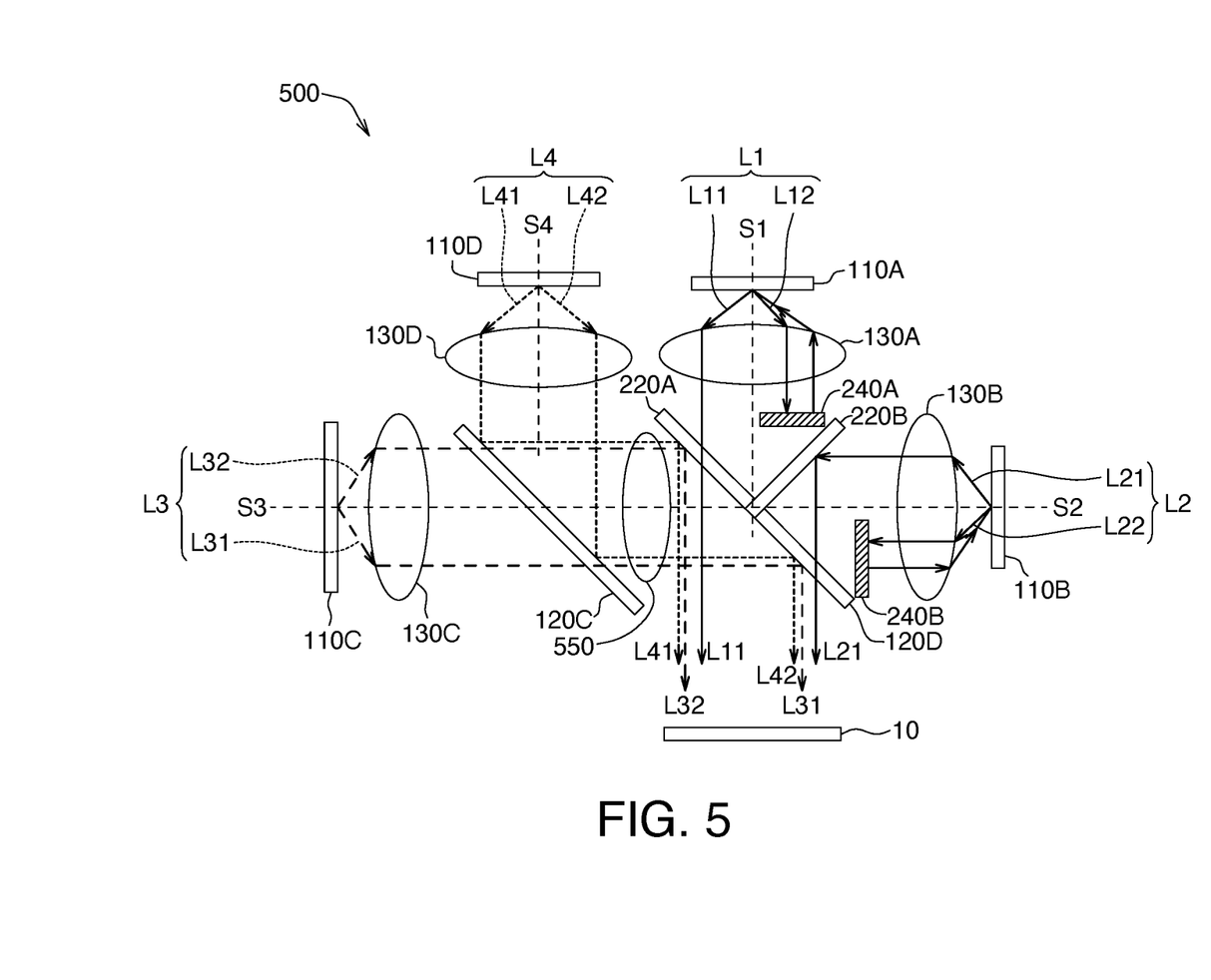
FIG. 5 shows a schematic diagram of an optical path of a light source module according to another embodiment of the present invention.

Referring to FIG. 5, FIG. 5 shows a schematic diagram of an optical path of a light source module 500 according to another embodiment of the present invention. The light source module 500 includes the first light source 110A, the second light source 110B, the third light source 110C, the fourth light source 110D, the first light-splitting element 220A, the second light-splitting element 220B, the third light-splitting element 120C, the fourth light-splitting element 120D, at least one condensing lens (for example, the first condensing lens 130A, the second condensing lens 130B, the third condensing lens 130C, and the fourth condensing lens 130D), the first reflective element 240A and the second reflective element 240B.

The light source module 500 has the technical features same as or similar to that of the aforementioned light source module 200 except that the light source module 500 includes a relay lens 550. The relay lens 550 could make the light in modules that travels a longer optical path also get better lighting efficiency.

In summary, the embodiment of the present disclosure provides a light source module including at least one light-splitting element and two light sources, wherein the two light sources are disposed adjacent to each other and/or their optical axes are substantially perpendicular. At least one light-splitting element is disposed between the two light sources, so that the optical path length of light emitted by the two light sources could be shortened. Due to two light sources having the same wavelength and disposed on adjacent sides, it could increase the brightness of the light source module. In addition, the light source herein is, for example, a light source that could actively emit light (including the semiconductor epitaxial layer), such as a light-emitting diode or a laser light source, but it could also be a light source that converts the wavelength of an external light and reflects it to be emitted (for example, without the light-emitting layer).

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A light source module, comprises:
   a first light-splitting element;
   a second light-splitting element;
   a first light source configured to emit a first light having a first wavelength to the first light-splitting element in a first optical path direction;
   a second light source configured to emit a second light having the first wavelength to the first light-splitting element in a second optical path direction substantially perpendicular to the first optical path direction;
   a third light source configured to emit a third light having a second wavelength to the first light-splitting element and the second light-splitting element in a third optical path direction, wherein the third optical path direction is opposite to the second optical path direction, and the second wavelength is different from the first wavelength;
   wherein the first light source comprises a first reflection layer, the second light source comprises a second reflection layer, and the first reflection layer and the second reflection layer are configured to reflect light having the first wavelength.

2. The light source module according to claim 1, wherein the first light-splitting element is configured to reflect the first light having the first wavelength and the second light having the first wavelength and the third light having the second wavelength.

3. The light source module according to claim 1, the second light-splitting element is configured to reflect the first light having the first wavelength and the second light having the first wavelength and allow the third light having the second wavelength to travel through.

4. The light source module according to claim 1, further comprises:
   a fourth light source configured to emit a fourth light having a third wavelength to the first light-splitting element and the second light-splitting element in the first optical path direction;
   a third light-splitting element disposed opposite to the third light source and the fourth light source, wherein the third light is incident to the third light-splitting element in the third optical path direction, and the fourth light is incident to the third light-splitting element in the first optical path direction third light-splitting element.

5. The light source module according to claim 4, wherein the fourth light source is disposed in a center line, and the center line passes through a center of the third light-splitting element.

6. The light source module according to claim 1, further comprises:
   a fourth light-splitting element disposed between the third light source and the second light source, wherein the fourth light-splitting element is configured to allow the first light having the first wavelength to travel through but reflect the third light having the second wavelength.

7. The light source module according to claim 1, wherein the third light source is disposed in a center line, and the first light-splitting element and the fourth light-splitting element are respectively disposed on two opposite sides of the center line.

8. The light source module according to claim 1, further comprises:
   at least one condensing lens disposed opposite to at least one of the first light source, the second light source and the third light source.

9. The light source module according to claim 1, wherein the first light source is disposed in a first center line, and the first light-splitting element is disposed on a side of the first center line.

10. The light source module according to claim 9, wherein the second light source is disposed in a second center line, and the first light-splitting element is disposed on a side of the second center line.

11. The light source module according to claim 1, further comprises:
    a first reflective element disposed opposite to the first light source and configured to reflect the first light having the first wavelength; and
    a second reflective element disposed opposite to the second light source and configured for reflect the second light having the first wavelength.

12. The light source module according to claim 11, wherein the first light-splitting element is configured to allow the first light having the first wavelength to travel through but reflect the third light having the second wavelength; the second light-splitting element is configured to reflect the second light having the first wavelength.

13. The light source module according to claim 11, wherein the first light source is disposed in a center line, and the first light-splitting element and the first reflective element are respectively disposed on two opposite sides of the center line.

14. The light source module according to claim 11, wherein the second light source is disposed in a center line, and the second light-splitting element and the second reflective element are respectively disposed on two opposite sides of the center line.

15. The light source module according to claim 1, wherein the first light source is disposed in a center line passing through a center of the first light-splitting element.

16. The light source module according to claim 15, wherein the third light source is disposed in a center line, and the light source module further comprises:
- a third light-splitting element configured to reflect the third light having the second wavelength;
- a fourth light-splitting element configured to reflect the third light having the second wavelength but allow the first light having the first wavelength and the second light having the first wavelength to travel through;
- wherein the third light-splitting element and the fourth light-splitting element are respectively disposed on two opposite sides of the center line.

17. The light source module according to claim 16, wherein the third light-splitting element is configured to allow light having a third wavelength to travel through; the light source module further comprises:
- a fourth light source configure to emit a fourth light having the third wavelength, wherein the fourth light-splitting element is configured to allow the second light having the first wavelength to travel through;
- wherein the fourth light source is disposed in a center line, and the second light-splitting element and the third light-splitting element are respectively disposed on two opposite sides of the center line.

18. The light source module according to claim 17, wherein the first light-splitting element is configured to allow light having the third wavelength to travel through; the light source module further comprises:
- a fifth light-splitting element configured to reflect the light having the third wavelength; and
- a fifth light source configured to emit a fifth light having the third wavelength to the first light source through the first light-splitting element and to the second light source through the fifth light-splitting element;
- wherein the first light source further comprises a first wavelength conversion layer, the second light source further comprises a second wavelength conversion layer, and the first wavelength conversion layer and the second wavelength conversion layer are configured to convert the fifth light having the third wavelength into light having the first wavelength.

19. The light source module according to claim 18, wherein the third light source is disposed in a center line, and the fifth light-splitting element is disposed in a side of the center line.

20. The light source module according to claim 1, wherein the first light source, the second light source and the third light source are respectively disposed in a first center line, a second center line and a third center line, and the first center line and the third center line are substantially coincident with each other, and the second center line is substantially perpendicular to the first center line and the third center line.

* * * * *